(12) United States Patent
Headley et al.

(10) Patent No.: US 12,228,908 B2
(45) Date of Patent: Feb. 18, 2025

(54) APPARATUS, SYSTEM AND METHODS FOR CNC MATERIAL CUTTING

(71) Applicant: TURF DESIGN, INC., Gilberts, IL (US)

(72) Inventors: Dustin Headley, Crystal Lake, IL (US); Tyler Van Kirk, Chicago, IL (US)

( * ) Notice: Subject to any disclaimer, the term of this patent is extended or adjusted under 35 U.S.C. 154(b) by 309 days.

(21) Appl. No.: 17/697,609

(22) Filed: Mar. 17, 2022

(65) Prior Publication Data

US 2022/0299977 A1      Sep. 22, 2022

Related U.S. Application Data

(60) Provisional application No. 63/162,164, filed on Mar. 17, 2021.

(51) Int. Cl.
*G05B 19/4099*      (2006.01)
*G05B 19/18*      (2006.01)

(52) U.S. Cl.
CPC ....... *G05B 19/4099* (2013.01); *G05B 19/182* (2013.01); *G05B 2219/33099* (2013.01); *G05B 2219/35091* (2013.01); *G05B 2219/45044* (2013.01)

(58) Field of Classification Search
None
See application file for complete search history.

(56) References Cited

U.S. PATENT DOCUMENTS 5,361,308 A * 11/1994 Lee .................. G06T 7/521
356/520
7,212,688 B2   5/2007 Zahner et al.

OTHER PUBLICATIONS

Sood, Sumit, et al. "3D representation and CNC machining of 2D digital images." Procedia Manufacturing 26 (2018): 10-20. (Year: 2018).*

* cited by examiner

*Primary Examiner* — Carlos R Ortiz Rodriguez
(74) *Attorney, Agent, or Firm* — Patrick Sheldrake (57) ABSTRACT

Techniques include converting an original or source image into a computer image file that uses guide curves to provide for a cutting of that image onto a surface of a material. One or more techniques comprise a process of converting the image into a computer image file, such as by pixelating or rasterizing the image. The process then controls a CNC knife to cut the surface of the material at different locations, different angles, different depths, and different range of motion, based on the processing of the computer image file, thereby creating the original image, or a very close replica, on the surface of the material. By deviating the cut lines from each other, the intensity of the image can be varied.

20 Claims, 13 Drawing Sheets

FIG. 10B

APPARATUS, SYSTEM AND METHODS FOR CNC MATERIAL CUTTING

CROSS-REFERENCE TO RELATED APPLICATIONS

This application claims priority to U.S. Provisional Patent Application No. 63/162,164, filed Mar. 17, 2021, entitled APPARATUS, SYSTEM AND METHODS FOR CNC MATERIAL CUTTING, which is hereby incorporated by reference in its entirety as though fully set forth herein.

FIELD OF THE INVENTION a. Technical Field

The present disclosure relates an apparatus, system and methods for cutting a material using a Computer Numeric Control process to create images in the surface of the material. In particular, the present disclosure relates to an apparatus, system and methods in which a knife or cutting tool controlled by a CNC machine is used to cut away slices of felt or PET material.

The present disclosure relates an apparatus, system and methods for cutting a material or sheet of material using a Computer Numeric Control (CNC) process to create images in the surface of the material by removing varying size sections or slices of material from the surface. In doing so, the present disclosure relates to an apparatus, system and related methods for generally converting a physical or virtual source image into guide curves, based on the intensity of portions of the source image, and for using a Computer Numeric Control (CNC) process to cut out portions or slices of the material from the surface to create a similar resultant image in the surface of the material. In particular, the present disclosure relates to an apparatus, system and methods in which a knife or cutting tool controlled by a CNC machine (a CNC knife) is used to cut away or remove slices of felt or PET material. The system removes material from the surface of the sheet thereby leaving an image in the remaining surface area that mirrors the source image.

The present disclosure further relates to a method or process of generating guide curves by extrapolating the black and white, RGB and/or alpha intensity values from the source image. Using the computer generated guide curves, the process divides the material by a set distance and creates control lines (straight lines) from end to end at each division, and creates variable lines (based on the guide curves) that deviate from the control lines based on the range of motion. The range of motion of the deviation is based on the intensity value of the source image pixel in relation to that (X, Y) coordinate on the output material surface. The control lines and the variable lines are then used to drive the CNC machine with the operations combining to precisely cut out portions of material to be removed. The relationship of removed material to remaining material resembles the source image.

As such, the present disclosure relates to a method or process of converting a source image into a computer image file made up of guide curves, such as by pixelating the image. The process then controls the CNC knife to cut the surface of the material based on the guide lines using the control lines, variable lines and the range of motion, thereby creating the original or source image (or a very close replica) on the surface of the material. The different guide curves, angles and depths create different apertures, which will represent and display different intensities of color or monochrome, when the image is cut into the material and the cut portion is removed. It is this crisscrossing operations (control lines and variable lines) that create the material to be cut out or subtraction of material. By cutting deeper or at different angles, the intensity of black and white or color can be varied, for example, the wider the cut, the greater the intensity, whereas with the same range of motion, a narrower cut will have reduced intensity.

The present disclosure further relates to a system configured using a program, such as a computer program that scans the original or source image and uses the resulting computer generated image to calculate the guide curves; the necessary location, angles, range of motion and depths of the cutting of the material to generate the resulting image on the surface of the material. Their relationship to each other are determined by the intensities; RGB, black and white, or alpha, at various locations (or those averages) in the image.

The guide curves are based on the intensity of that portion of the original image at a particular location. Once the program has converted the original image into the computer image, the process will control the CNC knife to cut sections or slices from the surface of the material to replicate the original image on the surface of the material.

The present disclosure further relates to an apparatus and system that is configured to use a single layer or multiple layers of material for the resulting image replication, and in the preferred embodiment, the present disclosure uses a single layer or laminated layers of recycled polyester felt or PET Felt. Although felt or PET Felt is the preferred material, the present disclosure can incorporate any material, including plastic, wood, metal, etc.

b. Background of Disclosure

In general terms, computer numerical control ("CNC") is the use of computers to provide automatic control of machining tools, such as lasers, water jet cutters, plasma cutters, drills, lathes, mills, etc. A CNC machine can process a piece of material (felt, metal, plastic, wood, ceramic, or composite) to provide an end product by following instructions or a coded programmed instruction, usually without any or hardly any assistance from a manual operator that would normally control the machining operation.

As such, the CNC machine is a motorized maneuverable tool or system, which is controlled by a computer based on the control program and the computer image file, according to the specific instructions of the control program. The specific instructions are delivered to the specific CNC machine in the form of a sequential program of machine control instructions such as G-code and M-code. The program then executes the instructions to control the CNC machine to process the particular material.

The process utilizes a graphical Computer Aided Design (CAD) software program usually in connection with a computer aided manufacturing (CAM) software program. It is the combination of the CAD, CAM and CNC programs that can turn a design into a finished product. CNC is a vast improvement over non-computerized machining that must be manually controlled or mechanically controlled by prefabricated pattern guides or cams.

In modern CNC systems, the design of a mechanical part and its manufacturing program is highly automated. The part's mechanical dimensions are defined using CAD software and then translated into manufacturing directives by the CAM software with the results converted into the specific commands necessary for a particular machine to produce the resulting component, which is loaded into the CNC machine for actuation.

The resulting motion necessary to process the material is attained by controlling multiple axes on the cutting tool. The position of the tool is usually driven by direct-drive stepper motors or servo motors to provide highly accurate movements.

As an example of a method of transferring an image to the surface of a material is the Computer Program And Method For Converting An image To Machine Control Data disclosed and claimed in U.S. Pat. No. 7,212,688 to Zahner et al., which discloses a method of transferring a representation of an image to a surface of a building, which comprises receiving the image as an image file, converting the image file to a raster file comprising a series of dots, scaling the raster file to the surface and dividing the raster file into a plurality of sub-components, associating the dots with markings, and transferring the markings onto a plurality of metal sheets. In the '688 patent, the markings may be indentations, holes, and/or bumps, and are preferably transferred to the sheets by a metal working machine.

This example utilizes a program to convert an image file into a raster file and marking the surface of a building using metal working machines. However, there exists a need for a process that converts an original image into a computer image file, which then controls a CNC machine such as a CNC knife, to cut, drill or otherwise indent the surface of a material at different angles and different depths, based on the processing of the computer image file, thereby creating the original image, or a very close replica, on the surface of the material, wherein the different angles and depths create different color or monochrome intensities.

The foregoing is intended only to illustrate the present technical field and background art and should not be taken as a limitation or disavowal of claim scope.

BRIEF SUMMARY

The present disclosure relates to an improved apparatus, system and related methods for converting a physical or virtual source image or original image into computer generated guide curves that can be used in the process. The present disclosure further relates to an improved apparatus, system and related methods for utilizing the guide curve information for cutting, slicing or indenting a material using one or more CAD, CAM and/or CNC programs or processes to create an image or images on the surface of the material similar to the source image. By utilizing the process, sections or slices of varying sizes and depths of the surface of the material can be removed from the surface to generate a replica of the source image.

In particular, the present disclosure relates to an apparatus, system and methods in which a cutting device, such as a knife controlled by a CNC machine (a CNC knife), is used to cut away or remove slices of material, such as felt or PET material, using different cutting angles and depths, from the surface of the sheet of material thereby leaving an image in the remaining surface area. The remaining surface displays different intensities of color or black and white, depending on the various cutting action and based on the guide curves.

An objective of the present disclosure is a method or process of converting an original or source image into a computer generated image that incorporates a series of curves or guide curves generated by the computer used to guide the CNC machine. Using these guide curves, the CNC machine will cut or slice the original image onto the surface of a material. In particular, an objective of the present disclosure relates to a process of converting an original or source image into a computer file, such as by pixilation or rasterization of the original image, for use by a CNC machine.

Another objective of the present disclosure is a method that uses the processing of the computer image to control the CNC knife to cut or slice the surface of the material at different angles and different depths and different range of motion, thereby creating the original image, or a close replica, on the surface of the material. In this method, the different angles, depths and range of motion will work to create different sizes and apertures, which will represent and display different color and/or monochrome intensities when the image is cut, sliced or indented. For example, by cutting deeper slices or at different angles, i.e., 30 or 45 degrees, or at a varying range of motion, the intensity of the resulting image can be varied. In this example, the 45 degree wider the cut will result in a greater intensity than that of a more narrow 30 degree cut or slice, if the range of motion stays the same.

Another objective of the present disclosure relates to a system configured to use a program, such as a computer program that scans an original or source image, generates a resulting computer image file, and utilizes the resulting computer image file to calculate the necessary location, angles and depths of the cuts or slices in the material that will generate the resulting image on the surface of the material. The resulting computer image file is made up of angles, depths, ranges of motion, and any other information that will assist in calculating the cuts and slices to generate the resulting image.

Yet another objective of the present disclosure is that once the program has converted the original image into the computer image file, the program or system will generate the control instructions that control the CNC cutting machine or knife to allow for the cut sections or slices to be removed from the surface of the material to replicate the original image on the surface of the material.

Still another objective of the present disclosure relates to an apparatus, system and the related methods that are configured to use a single layer or multiple layers of material, for example, layers laminated together, to create the resulting image replication. The objective of the present disclosure in the preferred embodiment, contemplates a single layer or laminated layers of recycled polyester felt or PET Felt, with the CNC cutting machine cutting or slicing the surface of the material to generate the resulting image. Although felt or PET Felt is the preferred material, the present disclosure can incorporate any material, including plastic, wood, metal, etc.

Additional objectives and advantages of the present disclosure will become apparent to one having ordinary skill in the art after reading the specification in light of the drawing figures, however, the spirit and scope of the present invention and the claims should not be limited to the description of the embodiments contained herein.

DETAILED DESCRIPTION

As stated herein, the objective of the present disclosure is to provide an apparatus, system and methods for cutting material using a Computer Numeric Control (CNC) process to create images in the surface of the material by removing varying size sections or slices of material from the surface. In particular, the objective of the present disclosure also relates to an apparatus, system and methods in which a knife or cutting tool controlled by a CNC machine is used to cut away or remove slices of felt or PET material, using guide curves, different cutting angles, depths and range of motion, to generate different intensities, from the surface of the sheet of material, thereby leaving an image in the remaining surface area.

Referring to the drawings, wherein like reference numerals refer to the same or similar features in the various views, FIGS. 1 through 6 show different views of the improved CNC cutting system 10.

Figure 1:
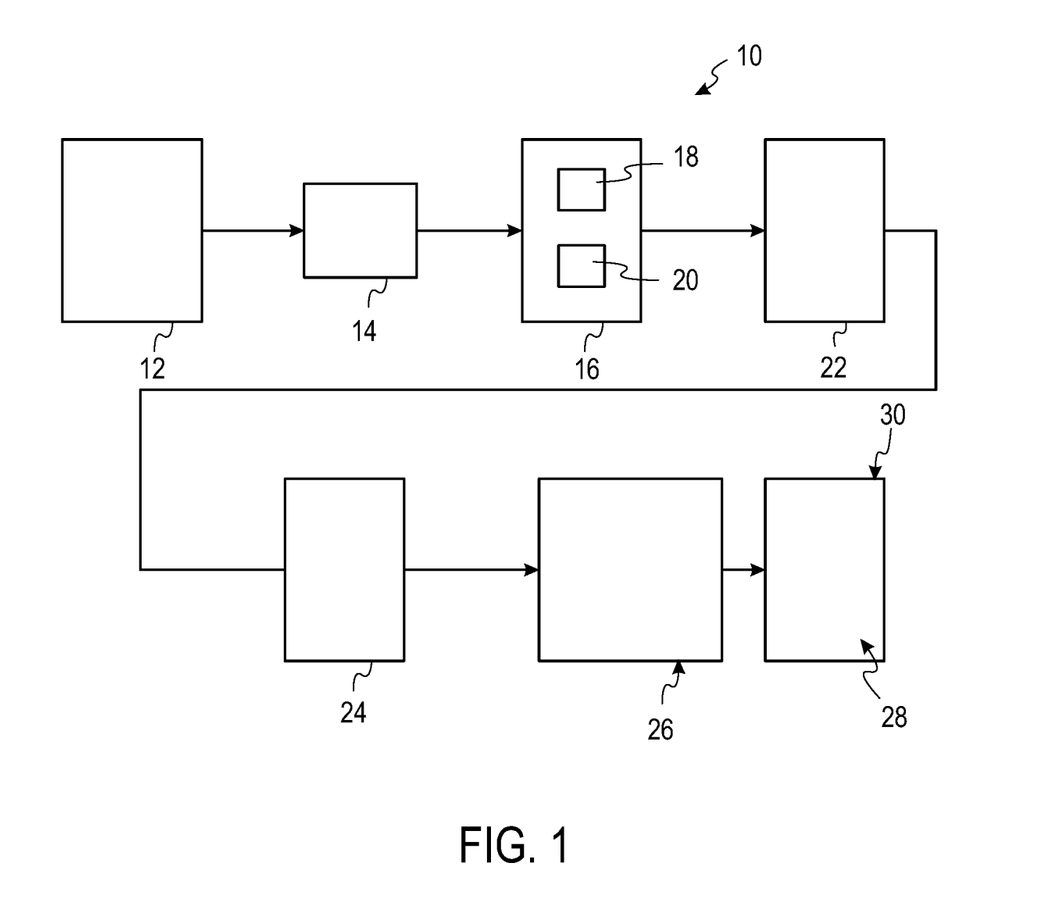
FIG. 1 is a functional block diagram of a CNC material cutting system in accordance with the present disclosure.

FIG. 1 shows a functional block diagram of the system 10, including the original or source image 12, the scanning device 14 for scanning the original or source image into the system 10. Of course, as understood by one having ordinary skill in the art, other ways exist of inputting or entering an original image into a computer 16, or a database 18 coupled to or connected to the computer 16. Once the original image 12 is scanned, captured, or otherwise inputted, a computer program 20 can convert the original or source image 12 through pixilation, rasterization or other methods, to create a computer image file 22 associated with the original image 12. As described in detail herein, the computer image file 22 incorporates or is made up of guide curves which will be used to control the cutting of the material.

Once the computer image file 22 is generated, a controller 24 uses the information to control a CNC cutting machine 26, as understood by one having ordinary skill in the art, to cut, slice or indent the surface 28 of the material 30, to replicate the original image 12 onto the surface 28 of the material 30.

Figure 2:
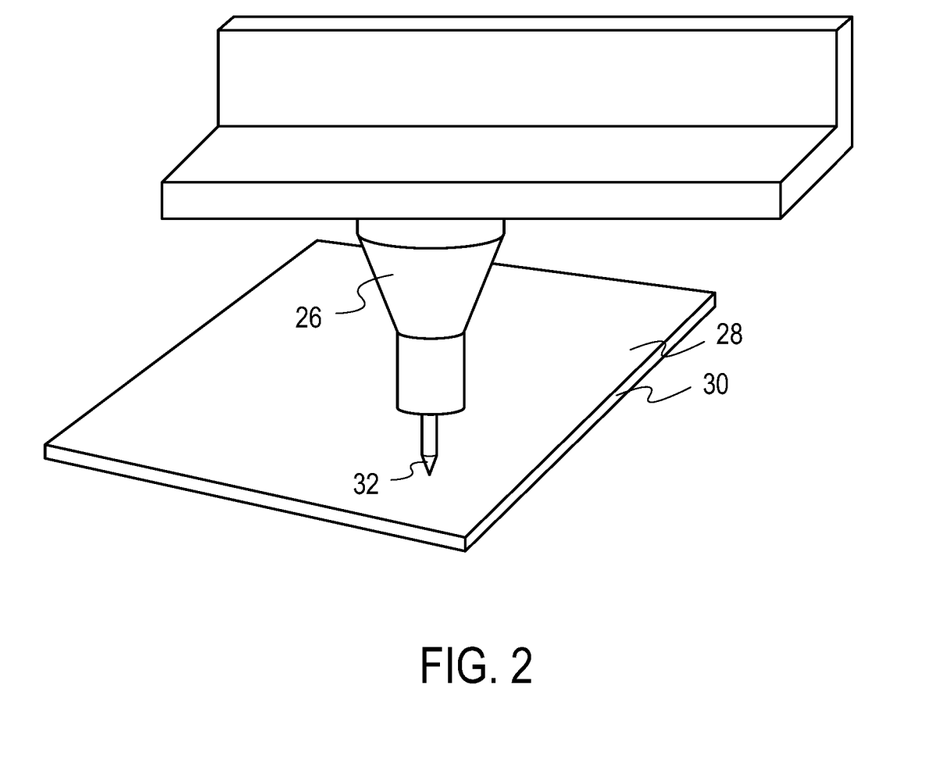
FIG. 2 is a perspective view of a CNC cutting machine of a CNC material cutting system in accordance with the present disclosure.

FIG. 2 shows the CNC cutting machine 26 that includes a cutting or slicing element 32 used to cut the surface 28 of the material 30. As understood, the CNC cutting machine 26, and in particular, the cutting element 32 can be moved in three dimensions X, Y and Z to effect cuts or slices in the material 30 in three dimensional space. A number of different cutting elements or devices 32 can be used to accomplish the same cutting or slicing effect, including lasers, milling machines and/or drilling devices.

Figure 3:
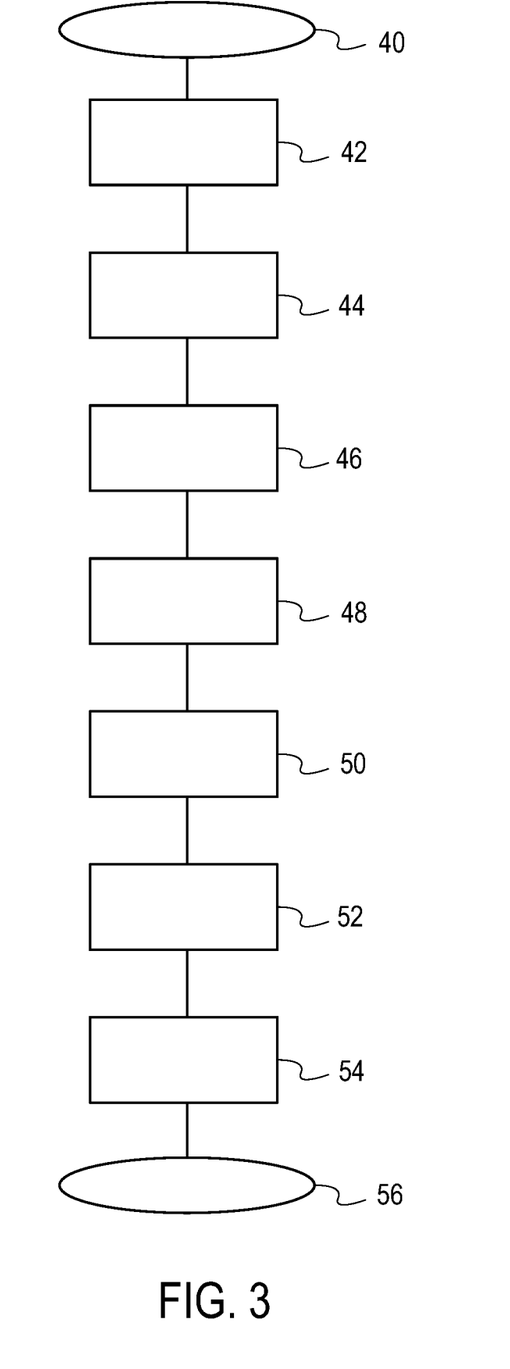
FIG. 3 is a flowchart of a CNC material cutting system in accordance with the present disclosure.

FIG. 3 shows a system flowchart for the cutting system 10. The program starts at step 40 and proceeds to initiate and utilize a scanning device 14 to scan in the original image 12 at step 42. If the original or source image 12 is a virtual or digital image, there is no need to scan the source image 12 and the process can begin at step 44.

Once scanned and/or saved into the database 18, step 44 uses the computer program 20 (stored in the database 18) to access the scanned original image 12 (also stored in the database 18) and converts the original image 12 to a computer image file 22. As described herein, the conversion includes any of a number of processes, but takes into account the intensities and/or colors of the original image 12 to generate the computer image file 22. This is important since depending on the intensities of the scanned original image 12, different ranges of motion, angles and depths (collectively guide curves) from the computer image file 22 will be used to control the CNC cutting machine 26 to remove slices from the surface 28 of the material 30 to replicate the original image 12.

Once converted, the computer image file 22 is stored in the database 20 at step 46, where, at step 48 it can be accessed by the computer program 18 for further processing. Next, at step 50, the system 10 and the computer program 18 will utilize CAD, CAM and/or CNC software to further process the computer image file 22 in order for final material cutting.

Once the computer image file 22 is ready at step 52, the program 18 accesses the controller 24 and instructs the controller 24 to control the CNC cutting machine 26. At step 54, the controller 24 controls the CNC cutting machine 26 to cut, slice or indent the surface 28 of the material 30, based on the guide curves in the computer image file, thereby creating the replicated image on the surface 28 of the material 30. The system process ends at step 56.

Although the process is described with various steps in a particular order, one having ordinary skill in the art would understand that these steps can be combined and/or further expanded without diverging from the scope of the disclosure described herein. Additionally, the order of the steps can be changed or modified, and additionally or alternatively, multiple databases or computer programs can be implemented with the same result.

The program(s) and database(s) can be located and accessed locally and/or remotely with the same results. For example, the program for converting the original image 12 to the computer image file 22 (step 44) can be located remotely, while the program or portion of the program for controlling the CNC machine (step 52) can be located locally on a local computer (or vice-versa). Another example includes a scanning device located remotely from the CNC cutting machine such that the original image 12 can be scanned remotely and the actual cutting (Step 54) can be done locally (or vice-versa). Of course, many other options exist all falling under the rubric of the disclosure herein.

Figure 4:
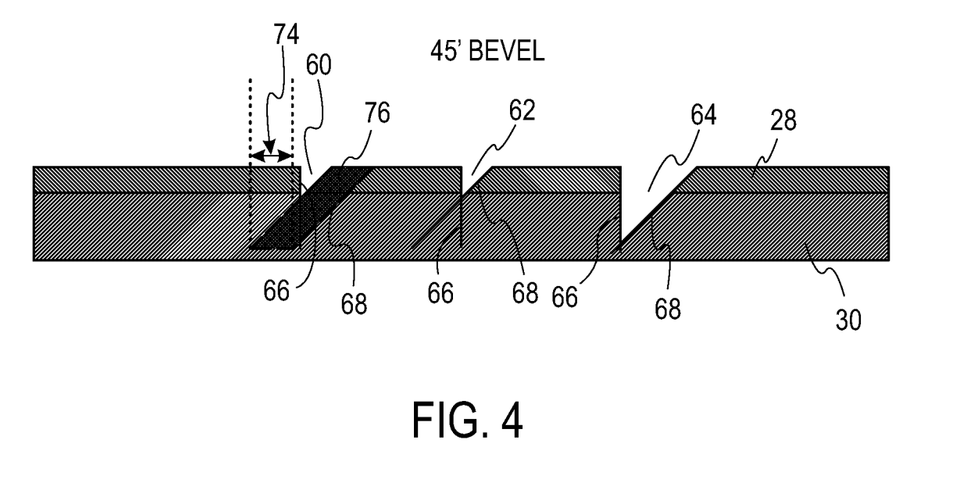
FIG. 4 is a side angle view of various 45 degree bevel cuts of a CNC material cutting system in accordance with the present disclosure.

FIG. 4 shows a side view of three 45 degree bevel cuts, the first 45 degree bevel cut 60, the second 45 degree bevel cut 62, and the third 45 degree bevel cut 64. The first 45 degree bevel cut 60 shows a control line 66 and a variable line 68. The control line 66 stays constant from a first end 70 (FIG. 5) of the surface 28 of the material 30 to a second end 72 (FIG. 5) of the surface 28 of the material 30. The variable line 68 deviates from the control line 66 based on the guide curve generated in the computer image file 22. The range of motion 74 is a function of the distance or deviation that the variable line 68 will move from and to the control line 66.

More or less of the shaded area 76 will be cut away depending on the deviation of the variable line 68 from the control line 66. The second 45 degree bevel cut 62 shows a smaller deviation between the control line 66 and the variable line 68 resulting in a smaller slice 78 (FIG. 5) and a minimum removal. The third 45 degree bevel cut 64 shows a larger deviation between the control line 66 and the variable line 68 resulting in a larger slice 78 (FIG. 5) and a maximum removal.

Figure 5:
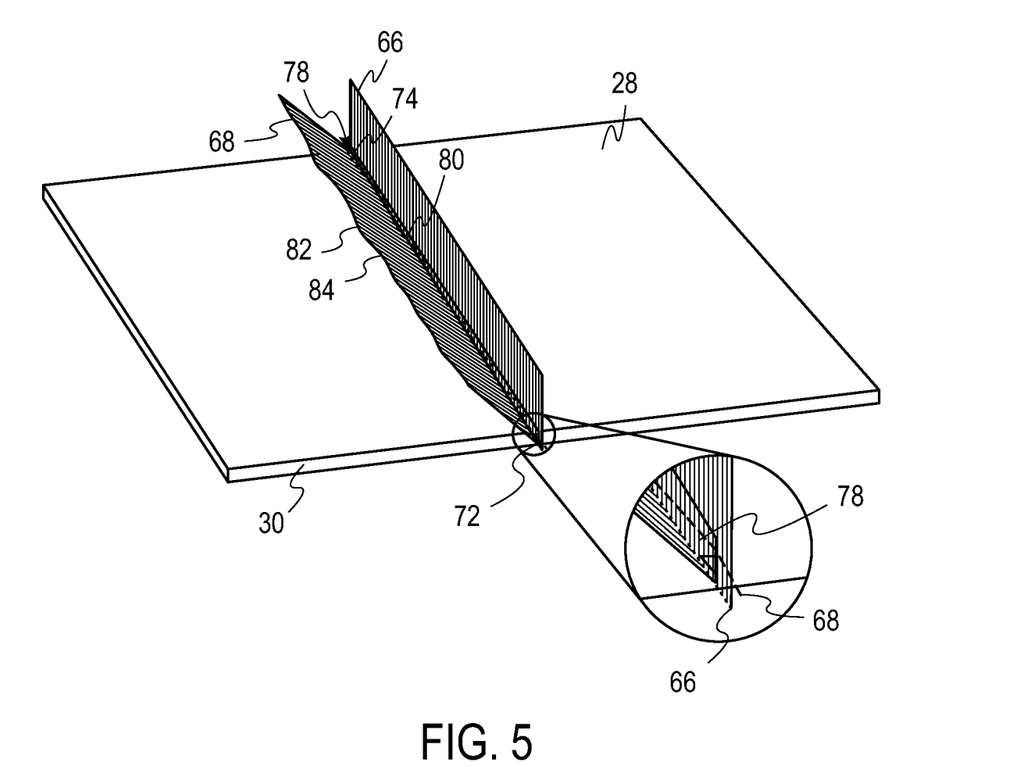
FIG. 5 is a perspective view of a 45 degree bevel cut of a CNC material cutting system in accordance with the present disclosure.

FIG. 5 shows a perspective view of a single continuous 45 degree bevel cut 80, using the control line 66 and the variable line 68. The control line 66 stays constant from the first end 70 of the surface 28 of the material 30 to a second end 72 of the surface 28 of the material 30. The changing deviation of the variable line 68 from further 82 to closer 84 to the control line 66, changes the amount of the slice 78 to be removed.

Figure 6:
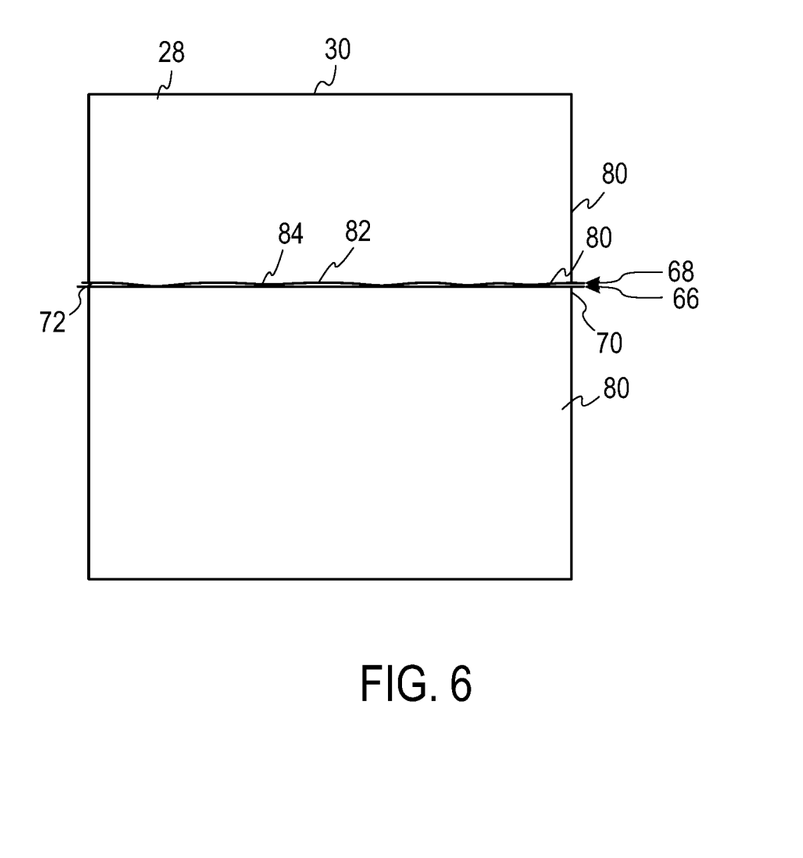
FIG. 6 is a top view of a bevel cut of a CNC material cutting system in accordance with the present disclosure.

FIG. 6 shows a top view of a multiple continuous 45 degree bevel cuts 80, using the control line 66 and the variable line 68. The control line 66 stays constant from the first end 70 of the surface 28 of the material 30 to a second end 72 of the surface 28 of the material 30. The changing deviation of the variable line 68 from further 82 to closer 84 to the control line 66, changes the amount of the slice 78 to be removed (FIG. 7A).

Figures 7A, 7B:
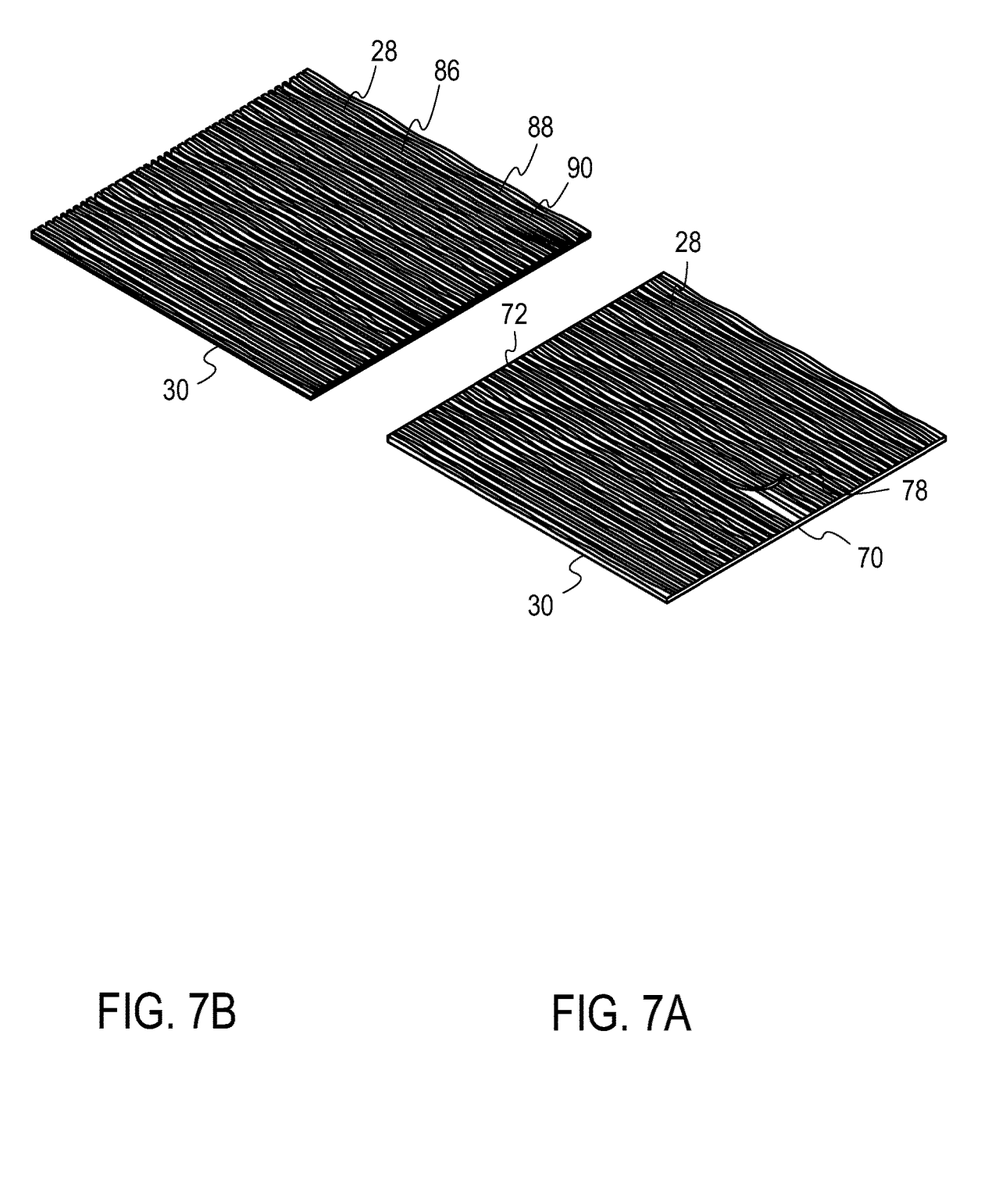
FIGS. 7A and 7B are perspective views of a 45 degree bevel cut of a CNC material cutting system in accordance with the present disclosure.

FIGS. 7A and 7B show perspective views of a multiple continuous 45 degree bevel cuts 80. The control line 66 stays constant from the first end 70 of the surface 28 of the material 30 to a second end 72 of the surface 28 of the material 30. The changing deviation of the variable line 68 from further 82 to closer 84 to the control line 66, changes the amount of the slice 78 to be removed. FIG. 7A shows the cut slice 78 being removed from the surface 28 or the material 30. FIG. 7B shows the resultant image 86 with areas of greater intensity 88, where the variable line 68 had maximum deviation from the control line 66. The resultant image 86 also shows area of lesser intensity 90, where the variable line 68 had minimal deviation from the control line 66.

Figure 8A:
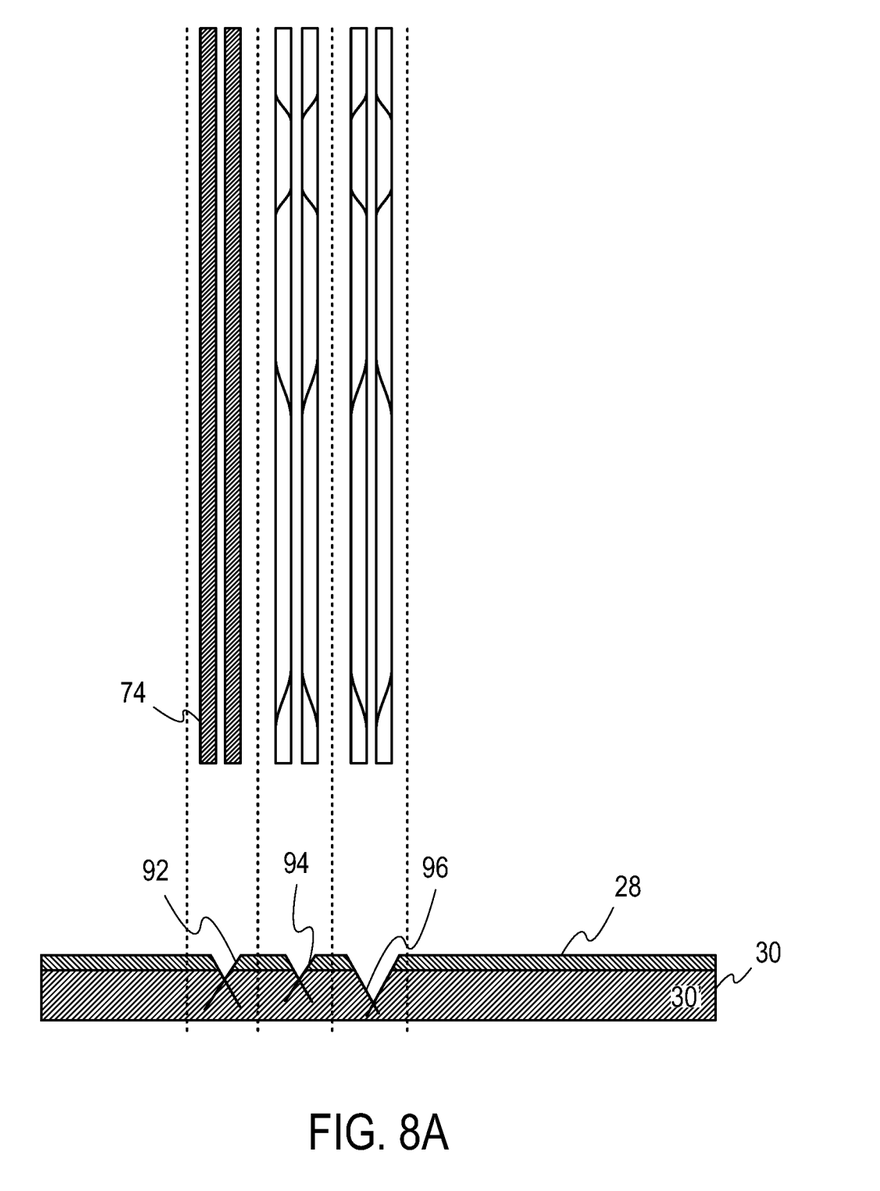
FIG. 8A is a perspective 30 degree top and side view of a CNC material cutting system in accordance with the present disclosure.
Figure 8B:
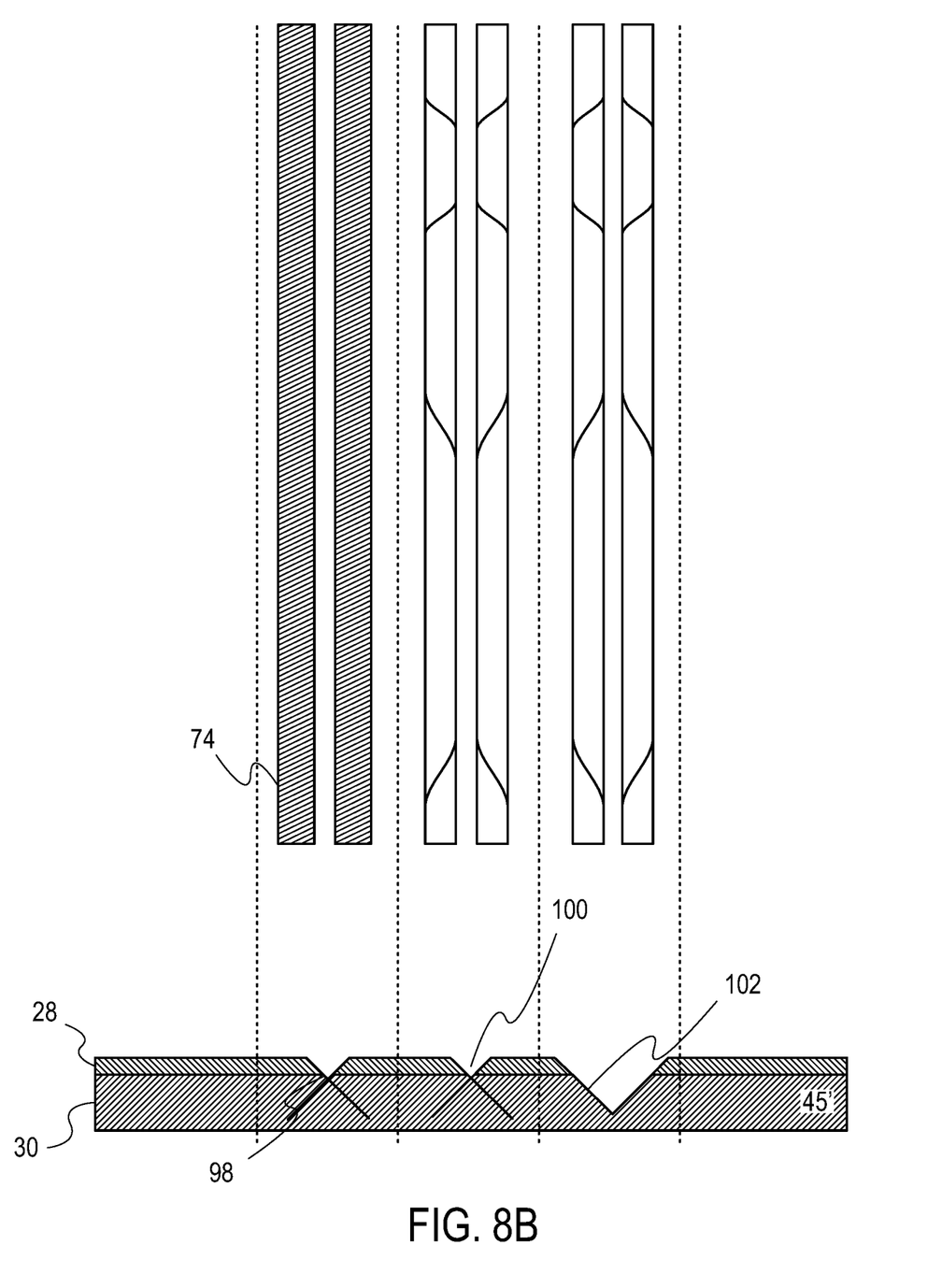
FIG. 8B is a perspective 45 degree top and side view of a CNC material cutting system in accordance with the present disclosure.

FIGS. 8A and 8B show alternative embodiments of the present disclosure. FIGS. 8A and 8B show the top and side views of the present disclosure including the various angles, depths and range of motions 74 of the cuttings on the surface 28 of the material 30 that allow for the different intensities depending on the original image 12.

FIG. 8A shows a first dual 30 degree cut 92, a second dual 30 degree cut 94, and a third dual 30 degree cut 96, at different heights that generate narrow 92, 94 and broad 96 cuts and a relatively lower 92, 94 and greater 96 intensity images. At 30 degrees, the first cut 92 will show a less intense view than the third cut 96.

FIG. 8B, on the other hand, shows a first dual 45 degree cut 98, a second dual 45 degree cut 100, and a third dual 45 degree cut 102, at different heights that generate narrow 98, 100 and broad 102 cuts and a relatively lower 98, 100 and greater 102 intensity images. At 45 degrees, the first cut 98 will show a less intense view than the third cut 102.

Figure 9A:
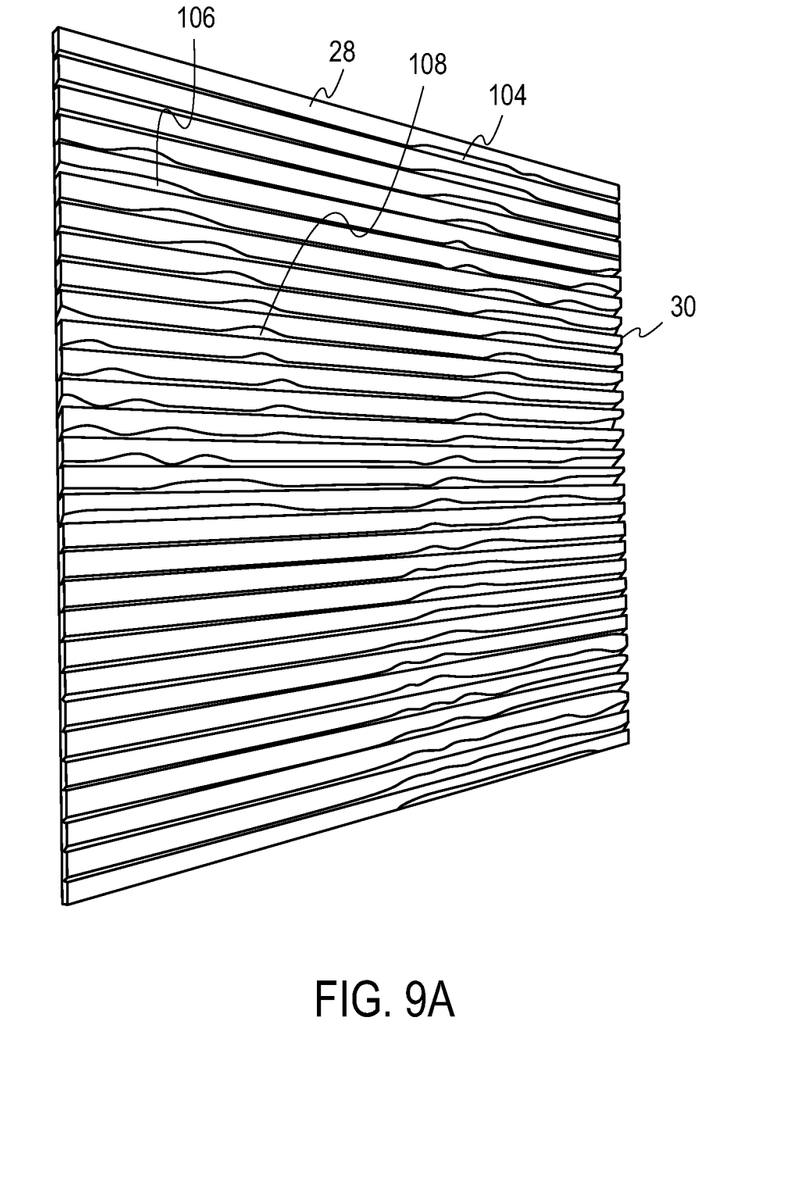
FIG. 9A is a perspective view of a cut material processed by a CNC material cutting system in accordance with the present disclosure.
Figure 9B:
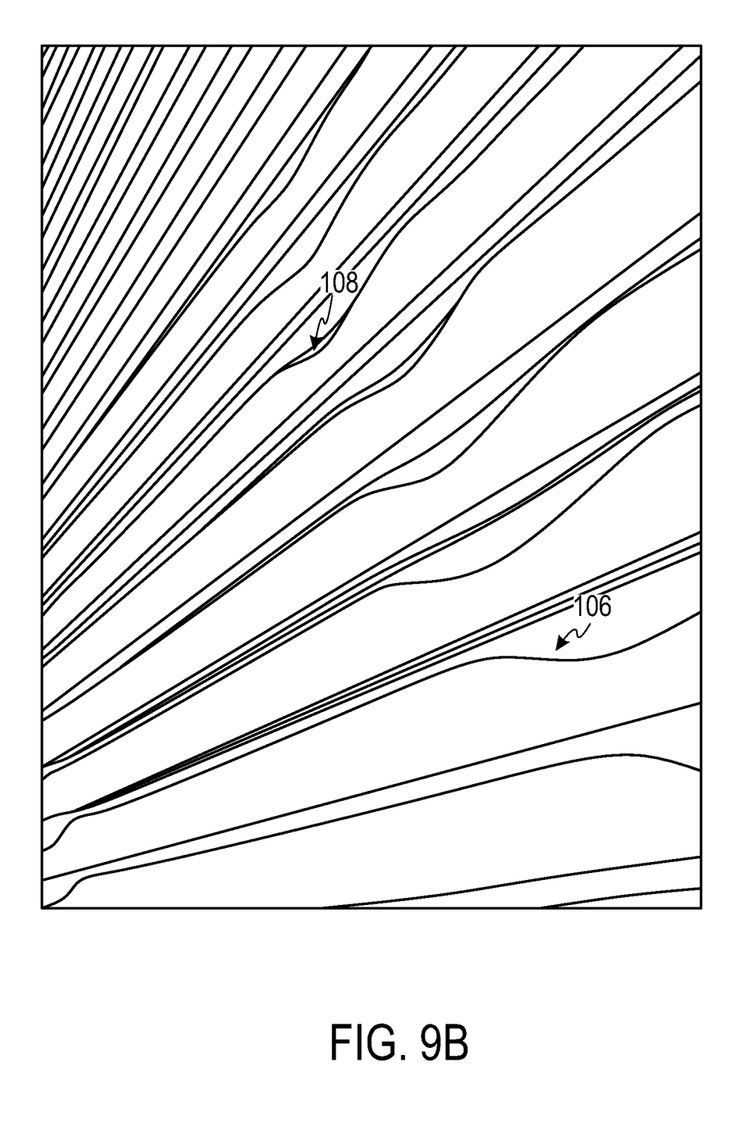
FIG. 9B is a perspective view of a close up of the cut material in FIG. 5A processed by a CNC material cutting system in accordance with the present disclosure.

FIGS. 9A and 9B show the resultant image on the surface 28 of the material 30. FIG. 9A shows a resultant image 104 after CNC cutting of the surface 28 of the material 30. FIG. 9B shows a close up of FIG. 5A. As shown, the wider angle cuts 106 have a greater intensity and show more color than the cuts having a narrower angle 108.

Figure 10A:
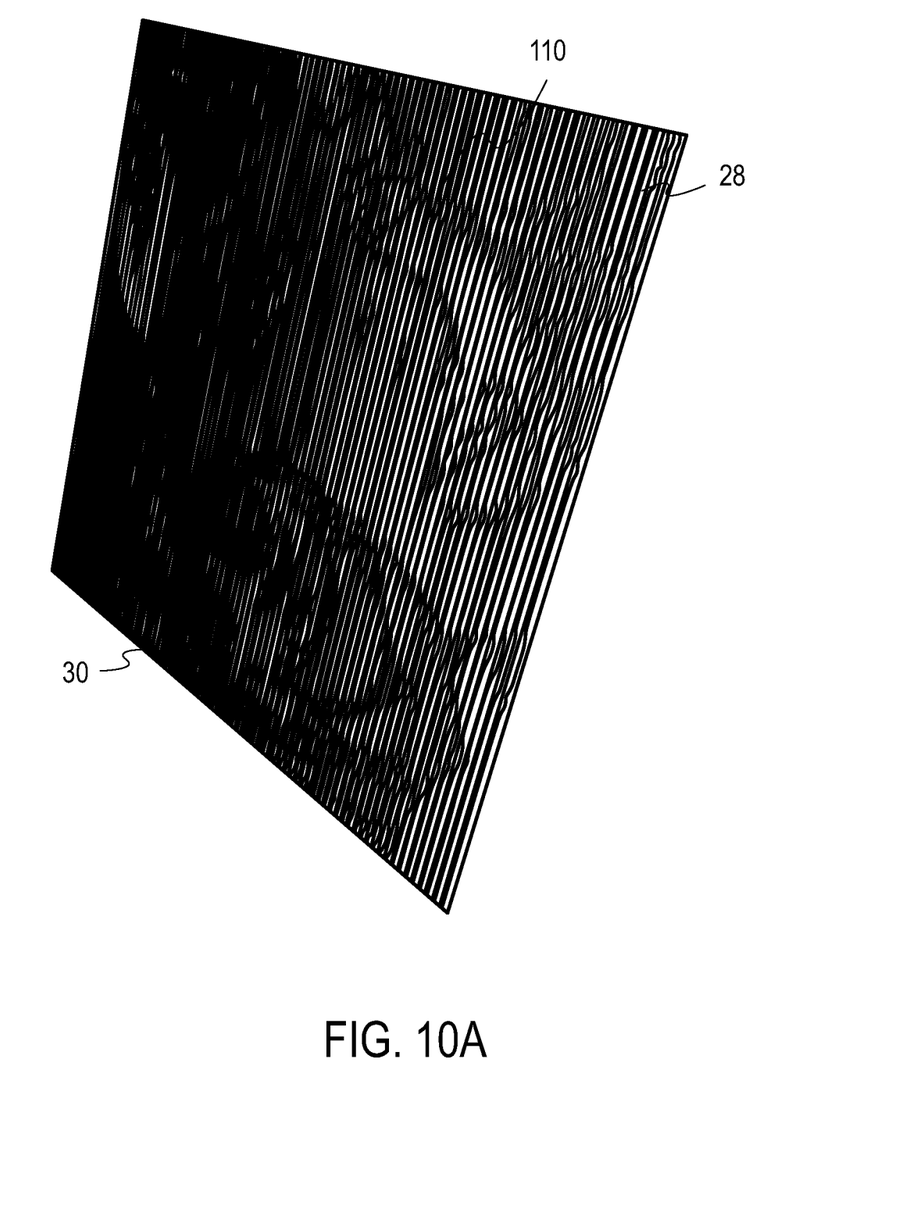
FIG. 10A is a perspective view of a cut material processed by a CNC material cutting system in accordance with the present disclosure.
Figure 10B:
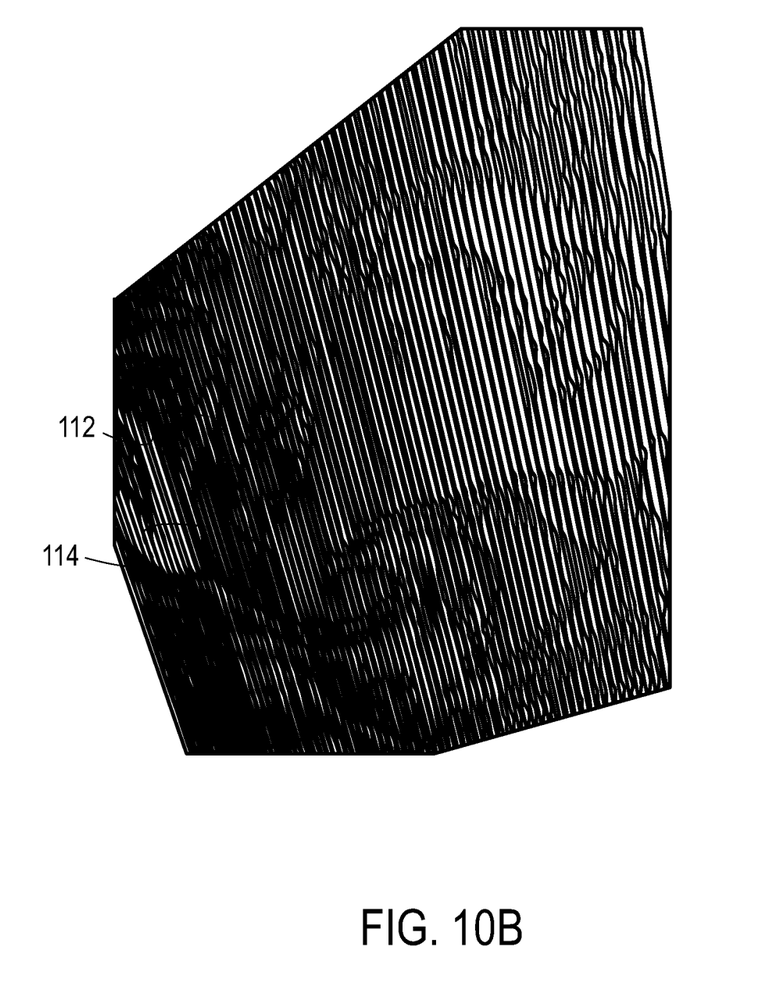
FIG. 10B is a perspective view of a close up of the cut material in FIG. 6A processed by a CNC material cutting system in accordance with the present disclosure.

Similarly, FIGS. 10A and 10B show the resultant image of a face of a person on the surface 28 of the material 30. FIG. 10A shows a resultant image 110 after CNC cutting of the surface 28 of the material 30. FIG. 10B shows a close up of FIG. 10A. As shown, the wider angle cuts 112 have a greater intensity and show more color than the cuts having a narrower angle 114.

As described herein, the material used in the preferred embodiment is polyester felt and is between 60% and 99% recycled material. Maintenance includes occasional vacuuming to remove particulate matter and air-borne debris or dust. Compressed air can be used to dust off the material in difficult to reach areas and for large assemblies.

The felt comes in numerous colors, including white, cream, light grey, light brown, brown, matte grey, charcoal, black, yellow, mango, orange, red, lavender, lime, green, light blue and dark blue, and can be manufactured in many other colors and the present disclosure is not limited to these specifications and colors, as these are merely the specifications and colors for the preferred embodiments and alternative embodiments.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment.

Further, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional. Although numerous embodiments of this invention have been described above with a certain degree of particularity, those skilled in the art could make numerous alterations to the disclosed embodiments without departing from the spirit or scope of this disclosure.

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A method of generating an image similar to a source image on a sheet of material, the method comprising:
    converting a source image into a computer image file using a computer program, said converting of said source image based on one or more intensity values of the source image, the converting comprising;
        generating a plurality of guide curves based on the one or more intensity values of the source image;
        generating at least one control line using at least one of the plurality of guide curves; and
        generating at least one variable line based on at least one of the plurality of guide curves;
    storing said computer image file into a database;
    accessing said computer image file for further processing;
    processing said computer image file using a software program;
    accessing a controller;
    instructing said controller control a CNC cutting machine; and
    controlling said CNC cutting machine to cut at least one slice of a surface of said sheet of material based on a changing deviation of the at least one variable line from the at least one control line, thereby creating at least part of an image on the surface of the sheet of material similar to the source image, the changing deviation of the at least one variable line from the at least one control line comprising:
        a portion of maximum deviation of the at least one variable line from the at least one control line; and
        a portion of minimum deviation of the at least one variable line from the at least one control line, the at least part of the image having an area of greater intensity corresponding to the portion of maximum deviation relative to an area of lesser intensity corresponding to the portion of minimum deviation, the controlling the CNC cutting machine further comprising cutting a larger amount of the at least one slice corresponding to the portion of maximum deviation relative to a smaller amount of the at least one slice corresponding to the portion of minimum deviation.

2. The method of generating an image on a sheet of material of claim 1, wherein said plurality of guide curves are created based on extrapolation of the black and white, RGB, or alpha intensity values of said source image.

3. The method of generating an image on a sheet of material of claim 2, wherein said plurality of guide curves determine the location, angle, range of motion and depth of the cutting of the sheet of material.

4. The method of generating an image on a sheet of material of claim 1, wherein the one or more intensity values of the source image comprises one or more intensity values at portions of said source image.

5. The method of generating an image on a sheet of material of claim 1, wherein said converting said source image into a computer image file comprises pixilation of the source image.

6. The method of generating an image on a sheet of material of claim 1, wherein said converting said source image into a computer image file comprises rasterization of the source image.

7. The method of generating an image on a sheet of material of claim 1, wherein said software program comprises one or more of a CNC, CAD or CAM software program.

8. The method of generating an image on a sheet of material of claim 1, wherein said CNC cutting machine comprises on or more of a laser cutting machine, a water jet cutter, a plasma cutter, a drilling machine, a lathe, and/or a milling machine.

9. The method of generating an image on a sheet of material of claim 1, wherein the area of greater intensity in the at least part of the image corresponds to an area of relatively high intensity in the source image.

10. The method of generating an image on a sheet of material of claim 1, wherein the area of lesser intensity in the at least part of the image corresponds to an area of relatively low intensity in the source image.

11. The method of generating an image on a sheet of material of claim 1, wherein the controlling the CNC cutting machine further comprises changing the amount of the at least one slice to be cut based on the changing deviation of the at least one variable line from the at least one control line.

12. A method of generating an image similar to a source image on a sheet of material, the method comprising:
    converting a source image into a computer image file, the converting of the source image based on one or more intensity values of the source image, the converting comprising;
        generating a plurality of guide curves based on the one or more intensity values of the source image;
        generating at least one control line using at least one of the plurality of guide curves; and
        generating at least one variable line based on at least one of the plurality of guide curves; and
    controlling a CNC cutting machine to cut at least one slice of a surface of the sheet of material based on a changing deviation of the at least one variable line from the at least one control line, thereby creating at least part of an image on the surface of the sheet of material similar to the source image, the changing deviation of the at least one variable line from the at least one control line comprising:
        a portion of maximum deviation of the at least one variable line from the at least one control line; and
        a portion of minimum deviation of the at least one variable line from the at least one control line, the at least part of the image having an area of greater intensity corresponding to the portion of maximum deviation relative to an area of lesser intensity corresponding to the portion of minimum deviation, the controlling the CNC cutting machine comprising cutting a larger amount of the at least one slice corresponding to the portion of maximum deviation relative to a smaller amount of the at least one slice corresponding to the portion of minimum deviation.

13. The method of claim 12, wherein the plurality of guide curves are created based on extrapolation of the black and white, RGB, or alpha intensity values of the source image.

14. The method of claim 13, wherein the plurality of guide curves determine the location, angle, range of motion and depth of the cutting of the sheet of material.

15. The method of claim 12, wherein the converting the source image into a computer image file comprises at least one of: a pixilation of the source image, or a rasterization of the source image.

16. The method of claim 12, wherein the converting the source image into the computer image file uses a computer program that comprises one or more of a CNC, CAD, and/or CAM software program.

17. The method of claim 12, wherein the CNC cutting machine comprises one or more of a laser cutting machine, a water jet cutter, a plasma cutter, a drilling machine, a lathe, and/or a milling machine.

18. The method of claim 12, wherein the area of greater intensity in the at least part of the image corresponds to an area of relatively high intensity in the source image.

19. The method of claim 12, wherein the area of lesser intensity in the at least part of the image corresponds to an area of relatively low intensity in the source image.

20. The method of claim 12, wherein the controlling the CNC cutting machine further comprises changing the amount of the at least one slice to be cut based on the changing deviation of the at least one variable line from the at least one control line.

* * * * *